United States Patent [19]

Pietzsch

[11] Patent Number: 5,567,004
[45] Date of Patent: Oct. 22, 1996

[54] COCKPIT FOR OPERATING VEHICLES AND HEAVY EQUIPMENT

[75] Inventor: Ludwig Pietzsch, Karlsruhe, Germany

[73] Assignee: Pietzsch Automatisierungstechnik GmbH, Ettlingen, Germany

[21] Appl. No.: 210,308

[22] Filed: Mar. 17, 1994

[30]   Foreign Application Priority Data

Mar. 18, 1993 [DE]   Germany .......................... 43 08 556.3

[51] Int. Cl.⁶ .................................................... B60K 37/06
[52] U.S. Cl. .................. 296/190; 180/90; 296/70
[58] Field of Search .................................. 296/190, 37.8, 296/70; 180/326, 329, 330, 331, 90

[56]       References Cited

U.S. PATENT DOCUMENTS 4,724,918   2/1988   Raineri .................... 296/70 X

FOREIGN PATENT DOCUMENTS

| 11446 | 1/1988 | Japan | 180/90 |
|---|---|---|---|
| 3273944 | 12/1991 | Japan | 180/90 |
| 5042854 | 2/1993 | Japan | 296/70 |
| 4213129 | 10/1993 | Japan | 296/70 |

*Primary Examiner*—Joseph D. Pape
*Attorney, Agent, or Firm*—Max Fogiel

[57]              ABSTRACT

A cockpit for operating vehicles and heavy equipment, especially cranes, construction equipment. It has a seat for the operator, a monitor for the controls, instruments in view of the operator, and at least one optionally multiple-function machinery control directly accessible by the seated operator. The monitor pivots and tilts around two non-parallel axes and can be directly viewed and accessed by the operator.

13 Claims, 1 Drawing Sheet

COCKPIT FOR OPERATING VEHICLES AND HEAVY EQUIPMENT

BACKGROUND OF THE INVENTION

Cranes and other heavy equipment and vehicles often include controls and monitors for controlling and monitoring their operation and travel. The monitors are installed in convenient places, the ceiling of the cab, for example, in a housing on the dashboard, or integrated into the dashboard itself. One particular problem is that incoming sunshine can cause enough glare to make the monitor impossible to read.

Visors of various designs have been proposed to counteract the glare and visibility problems. Such visors, however, are difficult to handle and often in the way.

SUMMARY OF THE INVENTION

The object of the present invention is an improved cockpit of the aforesaid genus and purpose with a seat for the operator, with a monitor for the controls, with instruments in view of the operator, and with at least one optionally multiple-function machinery control directly accessible by the seated operator, whereby the monitor pivots and tilts around two non-parallel axes and can be directly viewed and accessed by the operator.

The point of the invention is accordingly that the monitor can be pivoted and tilted around two preferably perpendicular axes and is associated with the operator's seat such that he can tilt and pivot the monitor to eliminate glare without having to leave his seat.

Providing the passenger seats in aircraft with pivoting and tilting television sets is known. The pivoting and tilting, however, is intended not to eliminate glare but only to adjust the position of the set to the needs of the individual viewer.

One advanced version of the cockpit in accordance with the invention is characterized by a monitoring-and-control console that accommodates both the monitor and a control panel with buttons, whereby the control panel swings back and forth between an operating position directly accessible to the seated operator and a non-operating position.

An operator seated in such a cockpit can operate the equipment, display data on the monitor, and view it without glare and without leaving his seat.

The monitor in another advanced version of the present invention can also travel up and down, even in and out of an accommodation compartment in the monitoring-and-control console through a rack-insertion opening in the top. The opening can be covered by a hinged lid while the monitor is inside it. The monitor can be mounted on a rack that can be removed from the monitor-accommodation compartment and/or separated from tracks that it lifts and lowers the monitor along. The rack can also be provided with electric plugs that automatically engage with and disengage from sockets in the compartment or on the tracks when the rack is inserted and removed or separated.

The capacity to remove the rack from the compartment makes it possible to protect the monitor from unauthorized use and vandalism. This feature is particularly important because heavy construction equipment is often left casually attended overnight and on weekends.

The lid over the rack-accommodation opening in the monitor-accommodation compartment in the control panel in another practical advanced version of the same embodiment is constituted by the control panel, which is hinged to one edge of the opening. The buttons can be on the side of the control panel that faces into the monitor-accommodation compartment while the panel is over the rack-insertion opening, in its on-operation position, that is.

The monitoring-and-control console in another important embodiment of the invention is a column with a monitor-accommodation compartment that has an opening in the top for the monitor to travel through. It is of advantage in this event for the monitoring-and-control console to be positioned immediately next to the machinery control, a joystick for example, and for the control panel to be hinged to the edge of the rack-insertion opening next to the operator's seat and locked into a position immediately accessible to the seated operator.

The monitor in still another embodiment automatically adjusts itself in accordance with prescribed instructions as to direction, speed etc. around both axes in one operating mode until the operation terminates adjustment. The monitor will accordingly adjust itself automatically and the operator can terminate the procedure once he has the best view. Upon termination the monitor will persist stationary in position until new adjustments are initiated. In one practical program of adjustment the monitor travels alternately back and forth and up and down between an upper stop and a lower stop at maximal speed.

This approach allows effective one-hand control. The operator can display necessary data by punching the buttons on the control panel without removing his other hand from the machinery control.

BRIEF DESCRIPTION OF THE DRAWINGS

One embodiment of the invention in the form of a cockpit with controls and a monitor for controlling and monitoring a crane will now be specified with reference to the schematic drawing, wherein.

DESCRIPTION OF THE PREFERRED EMBODIMENTS

Figure 1:
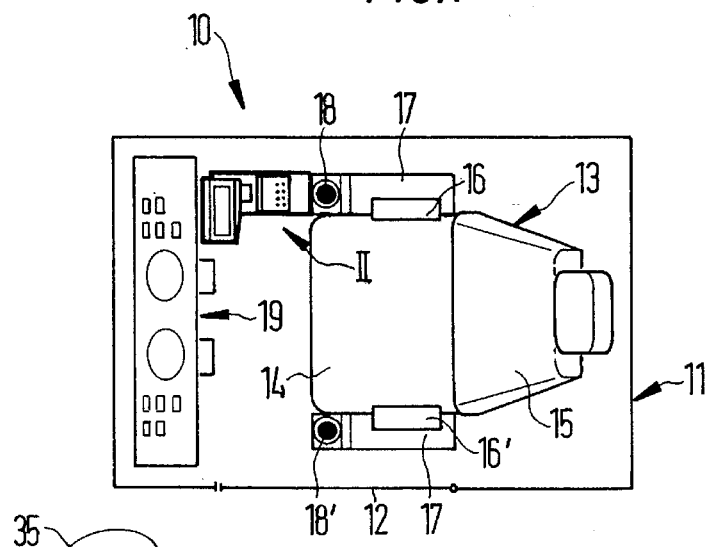
FIG. 1 is a horizontal section through the cab of a crane illustrating a cockpit with a monitoring-and-control console from above.

The cockpit 10 of an unillustrated crane illustrated in its entirety in FIG. 1 is part of a cab 11 with windows essentially all around and a door 12. It accommodates a seat 13 with a cushion 14, a back 15. and arms 16 and 16'. Brackets 17 and 17' extend below each arm 16 and 16'. At the end of each bracket remote from the back of the seat is a multiple-function machinery control in the form of a joystick 18 and 18'.

The cab also accommodates a dashboard 19 with instruments of no further interest in the present context in view of an operator in seat 13.

Figure 2:
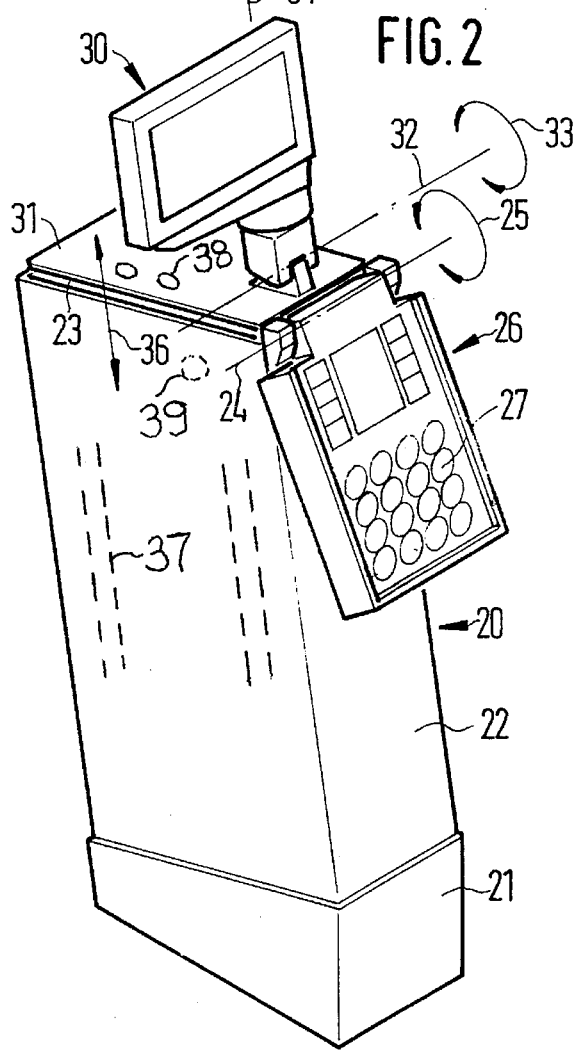
FIG. 2 is a perspective view of the monitoring-and-control console in the operating position from the direction indicated by the arrow in FIG. 1.

The monitoring-and-control console 20 illustrated on its own in FIGS. 1 and 2 comprises a housing 22 on a base 21. It has a rectangular footprint and an opening 23 in the top for a rack to be inserted through. A control panel 26 swings back and forth on housing 22 by way of a hinge 24 at one end of rack-insertion opening 23 in the direction indicated by arrow 25 between the non-operating position over rack-insertion opening 23 illustrated in FIG. 3 and the position illustrated in FIG. 2. Mounted on control panel 26 are buttons of no particular interest in the present context.

Monitoring-and-control console 20 also includes a monitor 30 mounted on a rack 31 that fits inside base 21. Monitor 30 tilts up and down around an axis 32 that parallels hinge 24 in the direction indicated by double-headed arrow 33. The monitor also pivots back and forth around an upright axis 34 perpendicular to axis 32 in the direction indicated by double-headed arrow 35. Rack 31 itself travels up and down on tracks 37 inside housing 22 in the direction indicated by double-headed arrow 36, carrying rack 31 into and out of housing 22.

Figure 3:
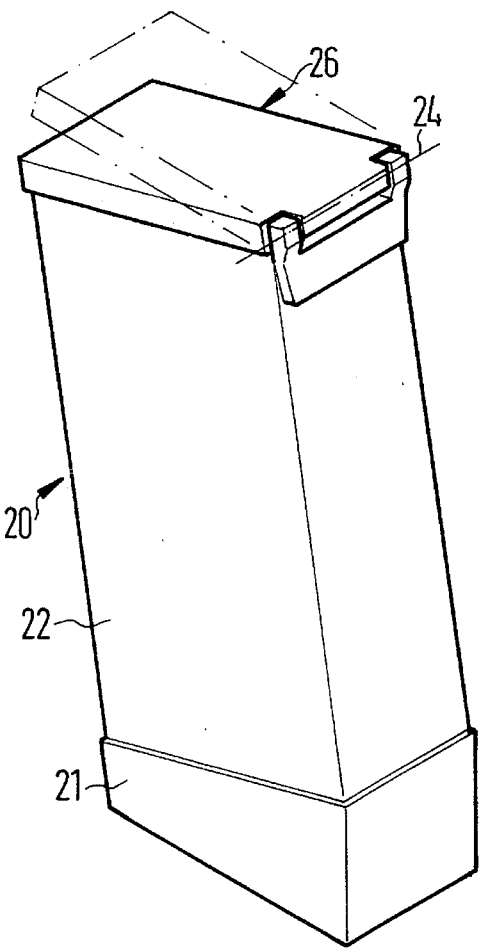
FIG. 3 is a perspective view similar to the one illustrated in claim 2 but in the non-operating position.

In the non-operating position illustrated in FIG. 3 the monitor 30, mounted on rack 31, is accommodated inside housing 22. The rack-insertion opening 23 in housing 22 is closed off by the folded-over control panel 26. The panel can be secured by an unillustrated locking mechanism, an ordinary latch for example.

FIG. 1 illustrates how monitoring-and-control console 20 is positioned in alignment with the bracket 17 on the right of cushion 14 and accordingly immediately next to joystick 18. An operator sitting in seat 13 can accordingly display data on monitor 30 by punching the buttons 27 on control panel 26 with the same hand he uses to control the joystick without leaving his seat and often without taking his hand off the joystick as long as the panel is in the operating position illustrated in FIG. 2.

Monitor 30 is also immediately accessible on rack 31 to an operator sitting in seat 13 as long as monitoring-and-control console 20 is in operation. Due to this arrangement of components and to the capacity of monitor 30 to tilt and pivot around axes 32 and 34, the operator can easily adjust the position of the monitor from seat 13 so that any data displayed on it will be legible without glare.

The tilting and pivoting capacity of monitor 30 is of particular significance in a cab that has windows essentially all the way around to prevent the operator from falsely interpreting the data displayed on the monitor as a result of glare.

In further embodiments of the present invention, the monitor 30 is mounted on a rack 31 that can be removed from the monitor-accommodation compartment 22 and/or separated from tracks that it lifts and lowers the monitor along.

The rack 31 is provided with electric plugs 38 that automatically engage with and disengage from sockets 39 in the monitor-accommodation compartment 22 or on the tracks when the rack is inserted and removed or separated.

The monitoring-and-control console 20 in another embodiment of the present invention is a columnar housing 22 with a monitor-accommodation compartment that has an opening 23 in the top for the monitor to travel through.

The monitor 30 automatically adjusts itself in accordance with prescribed instructions as to direction, speed, etc., around both axes in one operating mode until the operator terminates adjustment.

In a program of adjustment, the monitor travels alternately back and forth and up and down between an upper stop and a lower stop at maximal speed.

I claim:

1. A cockpit for operating vehicles and heavy equipment, comprising: a seat for an operator, a coverable display traveling up and down; instruments in view of the operator; at least one multiple-function machinery control directly accessible by a seated operator; said display pivoting and tilting around two non-parallel axes and being directly viewable and accessible by the operator.

2. A cockpit as defined in claim 1, including a monitoring-and-control console accommodating both said display and a control panel with buttons; said control panel swinging back and forth between an operating position directly accessible to the seated operator and a non-operating position independent of said display.

3. A cockpit as defined in claim 2, including an accommodation compartment in said monitoring-and-control console; said compartment having a rack-insertion opening in a top area of said compartment; said display traveling in and out of said accommodation compartment in said monitoring-and-control console through said rack-insertion opening coverable by said control panel when said display is inside said compartment.

4. A cockpit as defined in claim 3, including a rack on said compartment and removable from said compartment; said display being mounted on said rack.

5. A cockpit as defined in claim 4, including electric plugs on said rack; sockets in said compartment, said electric plugs engaging with and disengaging from said sockets in said monitor-accommodation compartment.

6. A cockpit as defined in claim 3, wherein said control panel is hinged to one edge of said rack-insertion opening.

7. A cockpit as defined in claim 6, including buttons on a side of said control panel facing into said monitor-accommodation compartment when said control panel is over said rack-insertion opening in said non-operation position.

8. A cockpit as defined in claim 6, wherein said compartment comprises a columnar housing.

9. A cockpit as defined in claim 8, wherein said monitoring-and-control console is positioned immediately next to said control, said control panel being hinged to an edge of said rack-insertion opening next to said operator's seat and locked into a position immediately accessible to the seated operator.

10. A cockpit as defined in claim 1, wherein said display adjusts itself in accordance with specific instructions in an operating mode until the operator terminates adjustment of said display.

11. A cockpit as defined in claim 10, wherein said display travels alternately back and forth and up and down at maximal speed.

12. A cockpit as defined in claim 4, including tracks on said compartment for lifting and lowering said display along.

13. A cockpit for operating vehicles and heavy equipment, comprising: a seat for an operator, a coverable display traveling up and down; instruments in view of the operator; at least one multiple-function machinery control directly accessible by a seated operator; said display pivoting and tilting around two non-parallel axes and being directly viewable and accessible by the operator; a monitoring-and-control console accommodating both said display and a control panel with buttons; said control panel swinging back and forth between an operating position directly accessible to the seated operator and a non-operating position independent of said display; an accommodation compartment inset monitoring-and-control console; said compartment having a rack-insertion opening in a top area of said compartment; said display traveling in and out of said accommodation compartment in said monitoring-and-control console through said rack-insertion opening coverable by said control panel when said display is inside said compartment; a rack on said compartment and removable from said compartment; said display being mounted on said rack; electric plugs on said rack; sockets in said compartment, said electric plugs engaging with and disengaging from said sockets in said monitor-accommodation compartment; said control panel being hinged to one edge of said rack-insertion opening; buttons on a side of said control panel facing into said monitor-accommodation compartment when said control panel is over said rack-insertion opening in said non-operation position; said compartment comprising a columnar housing; said monitoring-and-control console being positioned immediately next to said control, said control panel being hinged to an edge of said rack-insertion opening next to said operators seat and locked into a position immediately accessible to the seated operator; said display adjusting itself in accordance with specific instructions in an operating mode until the operator terminates adjustment of said display; said display traveling alternately back and forth and up and down at maximal speed.

* * * * *